United States Patent [19]

Schwartz

[11] Patent Number: 4,613,249

[45] Date of Patent: Sep. 23, 1986

[54] ADJUSTABLE CONDUIT CLAMP

[75] Inventor: Edward J. Schwartz, Grosse Pointe Woods, Mich.

[73] Assignee: Fulton Manufacturing Corporation, West Allis, Wis.

[21] Appl. No.: 693,515

[22] Filed: Jan. 22, 1985

Related U.S. Application Data

[63] Continuation of Ser. No. 586,201, Mar. 5, 1984, Pat. No. 4,529,331.

[51] Int. Cl.⁴ .............................................. F16B 1/00
[52] U.S. Cl. ........................................ 403/3; 403/205; 403/403
[58] Field of Search .................. 403/97, 385, 205, 98, 403/234, 191, 188, 190, 389, 386, 391, 400, 3

[56] References Cited

U.S. PATENT DOCUMENTS

| | | | |
|---|---|---|---|
| 918,617 | 4/1909 | Walsh | 403/190 X |
| 1,835,339 | 12/1931 | Rossman | 403/188 |
| 2,419,393 | 4/1947 | Doyle | 403/391 X |
| 2,555,226 | 5/1951 | Draughn | 403/97 X |
| 2,816,672 | 12/1957 | Facchini | 403/97 X |
| 4,007,993 | 2/1977 | Schwartz | 403/191 X |

FOREIGN PATENT DOCUMENTS 423146  1/1935  United Kingdom ............... 403/385

Primary Examiner—Andrew V. Kundrat
Attorney, Agent, or Firm—Burton, Parker & Schramm

[57] ABSTRACT

A pair of pipe clamps each having a pair of gripping members for clamping a pipe therebetween with the pipe extending through the clamps beyond opposite sides and with each clamp having a generally L-shaped projection away from the gripping members with the plane of the web lying in the plane of a pipe clamped in the gripping members and means for pivotally connecting and adjustably clamping the webs.

3 Claims, 11 Drawing Figures

U.S. Patent  Sep. 23, 1986  Sheet 1 of 2  4,613,249
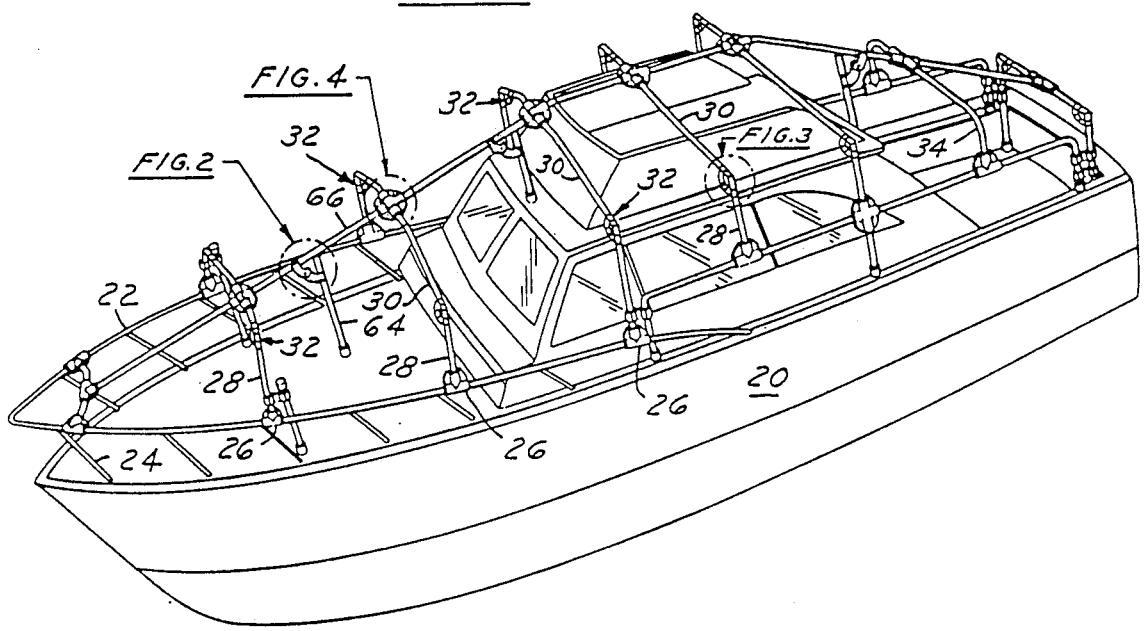
FIG.1
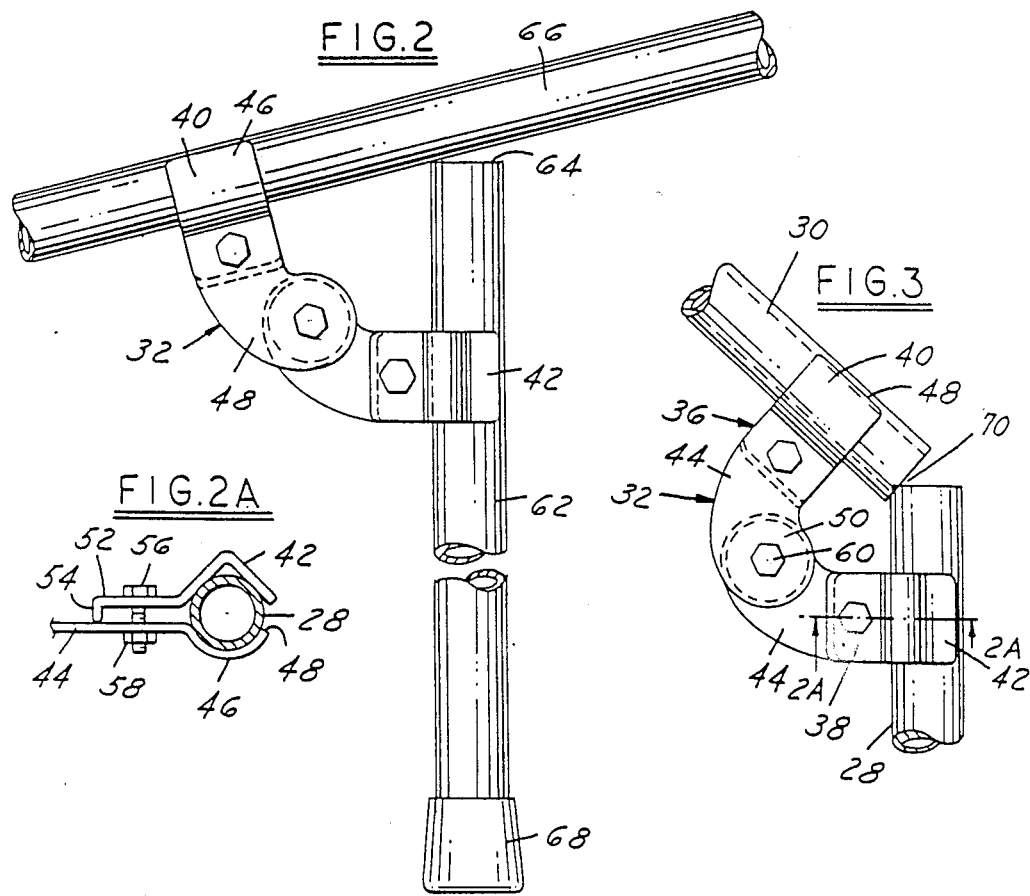
FIG.2
FIG.2A
FIG.3

ADJUSTABLE CONDUIT CLAMP

This application is a continuation, of application Ser. No. 586,201 filed Mar. 5, 1984, now U.S. Pat. No. 4,529,331.

DESCRIPTION

1. Field of Invention

This invention relates to couplings for securing tubular members such as pipe and conduit together in angularly related positions and discloses improvements in U.S. Pat. No. 4,007,993.

2. Background of the Invention

In the construction of frames for boat covers, tents or other temporary structures, particularly where the frame will be a "do-it-yourself" project, there has been a need for couplings or fittings that would enable pipe or conduit, such as electric conduit, to be connected together in angularly related positions other than 90°. This need arises not only in the connection of two conduits, but also where a four-way junction is involved.

SUMMARY OF THE INVENTION

This invention makes possible the joining of two pipes or conduits to extend away from each other in any desired angular relationship and wherein the loading is transmitted directly from one pipe section to the other. The invention also makes possible the provision of a four-way connector which is angularly adjustable whereby two of the connecting pipes may be adjusted relative to each other up to 90° with stops for limiting this adjustment either at 45° or at 90°. The coupling may be readily assembled and disassembled to the pipe or conduit, using simple tools such as a wrench.

BRIEF DESCRIPTION OF THE DRAWINGS

FIG. 1 is a perspective view showing the invention embodied in connectors used in the construction of a winter cover for a boat;

FIG. 2 is a side elevation of one embodiment of the connector as shown in FIG. 1;

FIG. 2A is a fragmentary cross-sectional view taken on the line 2A—2A of FIG. 3;

FIG. 3 shows the connector of FIG. 2 at a different angularly adjusted position;

DETAILED DESCRIPTION OF THE INVENTION

Figure 4:
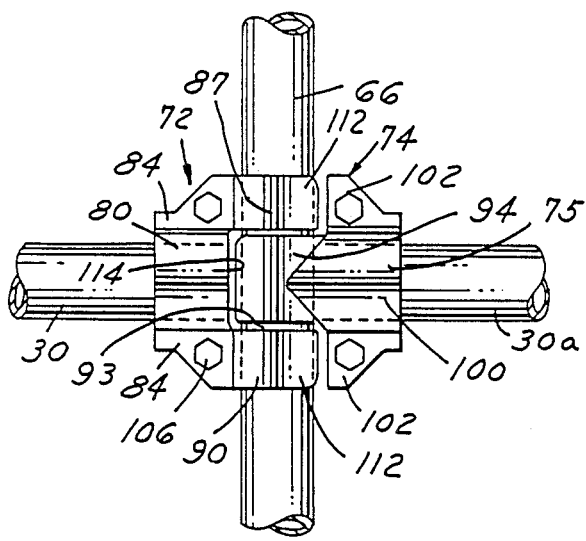
FIG. 4 is a plan view of a four-way connector embodying the invention looking in the direction of arrows 4—4 in FIG. 6.

In FIG. 1 I have shown a winter cover frame for a power boat in which the frame is constructed utilizing the teaching of U.S. Pat. No. 4,007,993 and the improved connectors of the instant application. The boat 20 includes as part of its equipment a lifeline rail 22 having upwardly extending stanchions 24, the rail and stanchions being permanently secured to, and a part of, the boat. In constructing the frame, connectors 26, which correspond to the connectors shown in U.S. Pat. No. 4,007,993, are fastened to the rail 22 and the frame members 28 are secured in the connectors and extend upwardly therefrom to be joined to the roof members 30 by connectors 32 as shown in FIG. 3 of the drawings. In the prior art where connector 32 was not present, the conduit was bent as at 34. Thus, connector 32 obviates the need to bend the tubing and facilitates the do-it-yourself construction of the tubular frame.

Connector 32 comprises a pair of pipe clamps 36 and 38, each having a pair of cooperating gripping members 40 and 42. The pipe clamps are of identical construction and therefore a description of one will suffice for both. One of the gripping members of each clamp has a web portion 44 which extends from the clamps into overlapping relation between the clamps as clearly shown in FIGS. 2 and 3. The web is shaped at one end to provide a curved pipe-receiving portion 46 whose curve substantially matches that of a standard diameter pipe or conduit to be gripped, such as ¾-inch pipe. The curved end portion 46 extends only partially around the pipe and terminates at the free edge 48. The opposite end 50 is generally curved in the plane of the web and terminates in the portion which overlaps the corresponding web of the opposite clamping member.

The gripping member 42 has a generally V-shaped pipe-receiving end which is adapted to overlie the opposite side of the pipe from the end 46. Gripping member 42 has at its other end a short web 52 terminating in a downturned flange 54 intended to bear against the web 44. Means are provided for pivotally connecting the overlapping end portions 50 of the clamps and for tightening the clamps on the pipe and locking the clamps in angularly adjusted positions. Such means includes bolt 56 extends through the two webs 44 and 52 with a nut 58 opposite the bolt head for tightening the clamps against pipe 28 disposed between the pipe-receiving ends. By virtue of having a V-shaped end 42 and an arcuately curved end 46, the pipe clamp will effectively secure varying diameter pipes which is an advantage for the do-it-yourself mechanic.

The means for pivotally connecting the overlapping ends 50 of the two pipe clamps comprise the shank portion of a bolt 60 having a head at one end overlying one of the end portions 50 and a nut (not shown) threaded onto the shank and overlying the end portion of the other clamp such that upon tightening the nut the overlapping end portions 50 may be drawn tightly together to lock the pipe clamps in an adjusted angular position to consequently hold the pipes 28 and 30 in adjusted angular positions.

The construction and arrangement of the pipe clamps forming the connector 32 is such that the pipes held by the clamps may abut one another as shown in FIGS. 2 and 3. In FIG. 2 an upright pipe 62 bears at its upper end 64 against another pipe 66 forming a portion of the roof of the frame whereby the loading on the roof member 66 is transmitted directly to the pipe 62. The lower end of pipe 62 may be provided with a rubber cap 68 to prevent damage to the deck of the boat. In FIG. 3, where the connector is used at an outside corner, the ends of the pipes may be arranged to slightly nestle or interfit, as at 70, whereby loading from the roof member 30 may be transmitted directly to the upright 28. It is apparent from a consideration of FIGS. 2 and 3 that the loading may be transmitted directly between the pipes received in the connector at substantially any angle of inclination between the pipes simply by adjusting the ends gripped by the pipe clamps so that the pipe abuts. This feature of the clamp is considered an important advantage of this connector.

Figure 5:
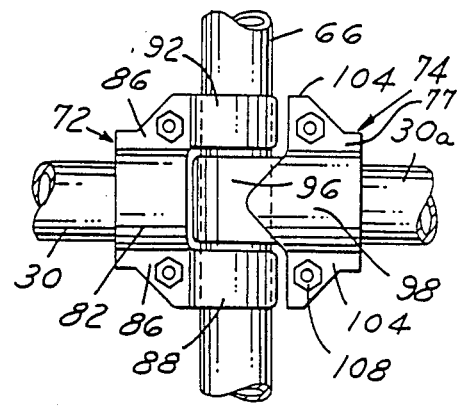
FIG. 5 is a bottom view of the connector of FIG. 4 looking in the direction of arrows 5—5 of FIG. 6.
Figure 6:
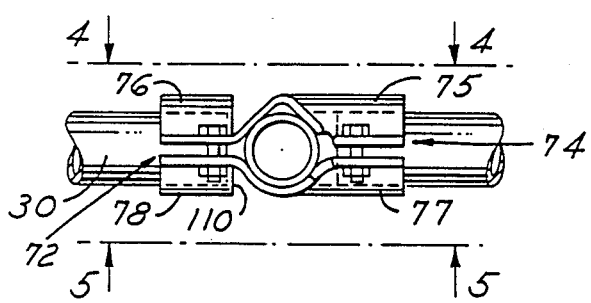
FIG. 6 is a side elevation of the connector shown in FIG. 4.
Figure 7:
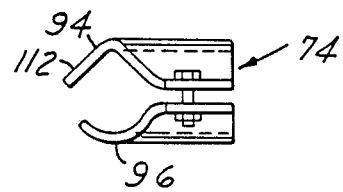
FIG. 7 is a side elevation of one of the clamps of the connector of FIG. 4.

Another embodiment of the invention is disclosed in the remaining figures of the drawings showing a four-way connector. This connector is shown in use in FIG. 1 where there is reference to FIG. 4. The roof pipe 66 extends completely through the connector as best shown in FIGS. 4 and 5. The connector comprises a pair of pipe clamps 72 and 74, each having a pair of cooperating gripping members adapted to clamp pipe therebetween. In the case of clamp 72, there are opposed cooperating pipe-gripping members 76 and 78, each configured to embrace a pipe 30 received therebetween, and for this purpose gripping member 76 may have a V-shaped configuration at 80. Gripper 78 may have a cylindrical curved portion 82 such that the cylindrically curved and V-shaped portions embrace opposite sides of the pipe 30 to accommodate pipes of varying diameter, as was the case with the connector 32. Clamp 72 includes gripper 76 having web portions 84 integral with the V-shaped portion 80 and gripper 78 having web portions 86 integral with the cylindrical portion 82. The grippers 76 and 78 terminate in opposed spaced apart pairs of pipe-gripping ends. One pair comprises the V-shaped gripping end 87 disposed in opposition to a cylindrical curved end 88, while the other pair comprises a V-shaped end 90 opposed to cylindrically curved end 92. It will be observed from FIGS. 4 and 5 that these pairs, i.e., 87–88 and 90–92, are disposed in spaced apart relation along the pipe 66 to form in effect a groove 93. Into this groove fits a tongue formed by the pipe-gripping ends 94 and 96 of the clamp 74. End 96 is a cylindrically curved portion which is an extension of the cylindrically curved portion 98 of gripper 75. The V-shaped end 94 is an extension of the V-shaped gripping portion 100 of the gripper 74. It will be noted that the gripping portions 96 and 98 are disposed at right angles to each other, as are the gripping portions 94 and 100.

Web portions 102 and 104 are adapted to receive bolts 106, having heads and nuts 108 such that upon tightening the nuts upon the bolts the gripping members are tightened upon the ends of the tubing 30 and 30a, as well as upon the pipe 66, thereby locking the connector in adjusted angular positions.

In a broad sense, clamps 72 and 74 terminate in overlapping pivotally connected portions 87–88, 90–92 and 94–96. Means are provided for pivotally connecting the clamps which comprises the pipe 66 embraced by such end portions of the clamps. The bolts 106 serve as means to draw the clamping members tightly against the pipe received therebetween to lock the clamps thereon and in determined angularly related positions. Thus, in a generic sense this embodiment is similar to the embodiment of FIGS. 2, 2A and 3.

Figure 9:
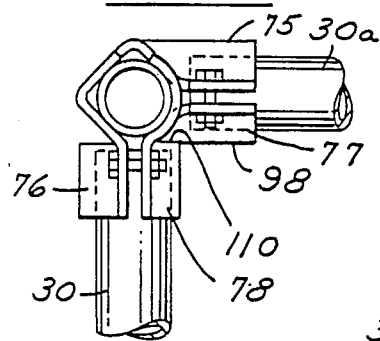
FIG. 9 is a side elevation showing the connector of FIG. 4 adjusted to its 90° position.
Figure 8:
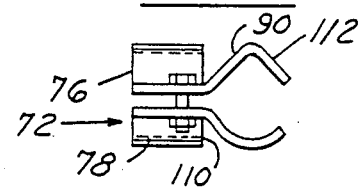
FIG. 8 is a side elevation of the other clamp of the connector of FIG. 4.
Figure 10:
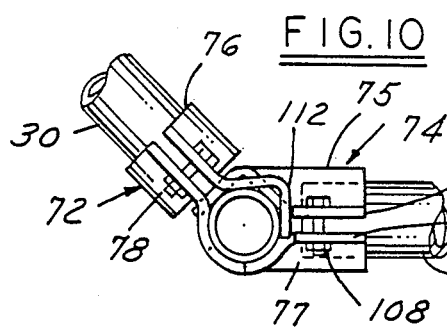
FIG. 10 is a side elevation of the connector of FIG. 4 adjusted to its 45° angular position.

The connector of FIGS. 4 and 5, in addition to being adjustable to various angular positions, may be locked in either a 90° position as shown in FIG. 9, or a 45° position as shown in FIG. 10. This is accomplished by virtue of the design wherein the cylindrically curved portion 98 of the gripper 77 will abut the end 110 of the cylindrically curved portion 78 of the gripper 78. On the other hand, to limit the swingable movement to 45°, faces 112 of the V-shaped ends 87 and 90 of gripper 76 will abut webs 102 and 104 of the gripper 75, as shown in FIG. 10. Thus, the connector of FIGS. 4 and 5 can swing through an arc of 135° from a position shown in FIG. 10 to the position shown in FIG. 9, and may be installed during the construction of a frame to accommodate the angle required between the various pipes to be connected. It will be noted that, as with the connector shown in FIGS. 2 and 3, this connector may permit the pipe to extend through the grippers to the point where the ends abut the other pipe being retained by the connector so that forces may be transmitted directly from one pipe to another.

I claim:

1. A pipe coupler for holding a plurality of pipes in angularly adjusted positions comprising, in combination:

a pair of pipe clamps each having a pair of cooperating gripping members adapted to clamp a pipe therebetween with the pipe extending completely through the clamps and projecting beyond opposite sides thereof;

said clamps each having a generally L-shaped web portion projection away from the gripping members with the plane of the web lying in the plane of a pipe clamped in the gripping members, said web portions arranged in face-to-face overlapping relation at the ends opposite the gripping members and disposing a pair of pipes clamped in the gripping members in a common plane;

means for pivotally connecting and adjustably clamping the webs;

means for adjustably clamping pipes in the gripping members;

whereby adjustment of both said means enables adjustable projection of pipes gripped by the pipe clamps into pipe abutting relation at any of a wide variety of angular relationships between the pipe so that loading on the pipes is transmitted directly from one pipe to the other.

2. The invention defined by claim 1 wherein said webs are generally L-shaped in the plane of the web with a pipe disposed in the pipe clamps lying in the plane of the web and said L shape.

3. The invention defined by claim 1 wherein each clamp comprises a pair of cooperating pipe gripping members one of which is generally V-shaped and one of which is generally curved.

* * * * *